2 Sheets—Sheet 1.

W. G. BROWNSON.
TELEGRAPHIC SWITCHBOARD.

No. 66,943. Patented July 23, 1867.

Witnesses:
David A. Burr
H. H. Young

Inventor:
W. G. Brownson

2 Sheets—Sheet 2.

W. G. BROWNSON.
TELEGRAPHIC SWITCHBOARD.

No. 66,943.              Patented July 23, 1867.

Witnesses:

Inventor:

United States Patent Office.

WALTER G. BROWNSON, OF WELLSVILLE, OHIO.

*Letters Patent No. 66,943, dated July 23, 1867.*

---

IMPROVEMENT IN TELEGRAPHIC SWITCH-BOARD.

---

The Schedule referred to in these Letters Patent and making part of the same.

---

TO ALL WHOM IT MAY CONCERN:

Be it known that I, WALTER G. BROWNSON, of Wellsville, in the county of Columbiana, and State of Ohio, have invented a new and improved Telegraphic Switch-Board; and I do hereby declare the following to be a full, clear, and exact description thereof, reference being had to the accompanying drawings, forming a part of this specification, in which—

Figure 1:
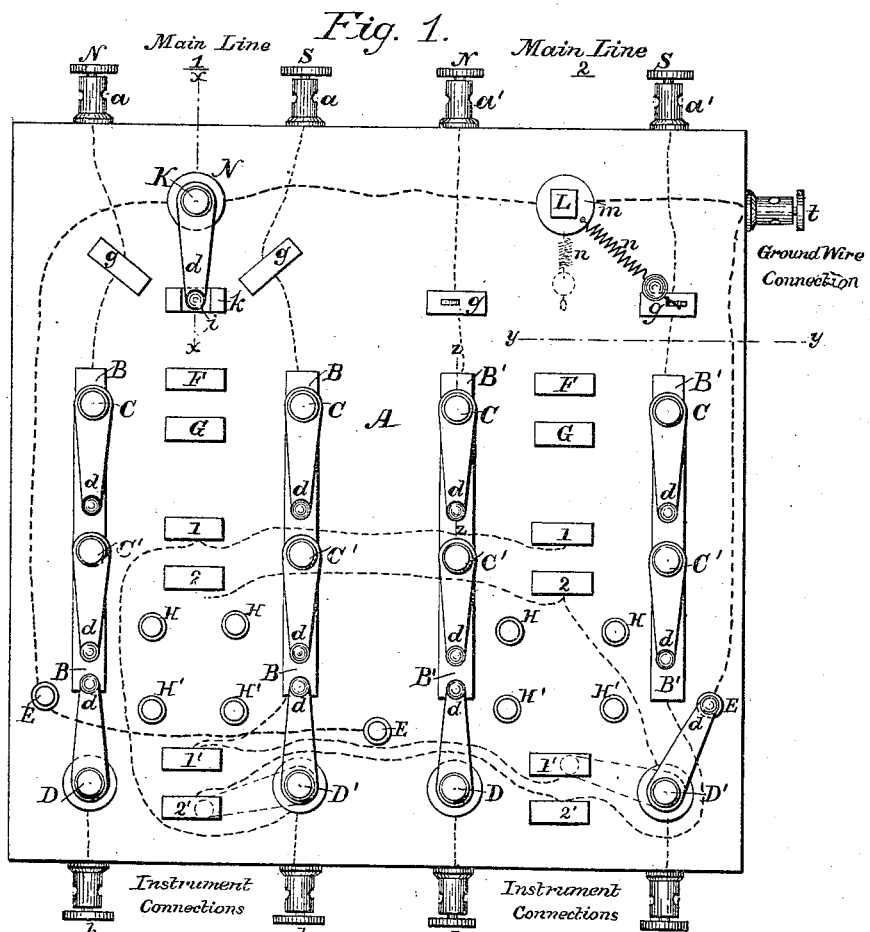

Figure 1 is a plan view of one side of my improved switch-board, the arrangement of wires on the reverse side thereof being indicated on said plan in dotted colored lines.

Figure 2:
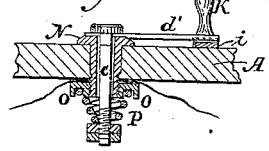

Figure 2, a detached section in the line $x\ x$ of fig. 1, illustrating the manner of attaching the switch-button to the board, and also my improved combination of spring, collar, and base spring-cup therewith.

Figure 3:
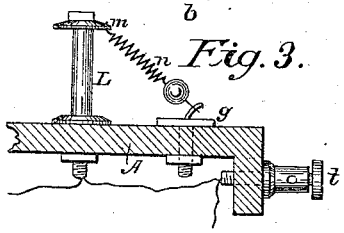

Figure 3, a detached section in line $y\ y$ of fig. 1, showing a detached elevation of improved ground-connection post.

Figure 4:
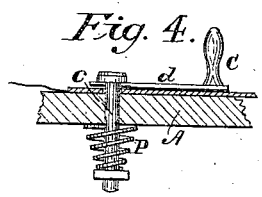
Figure 5:
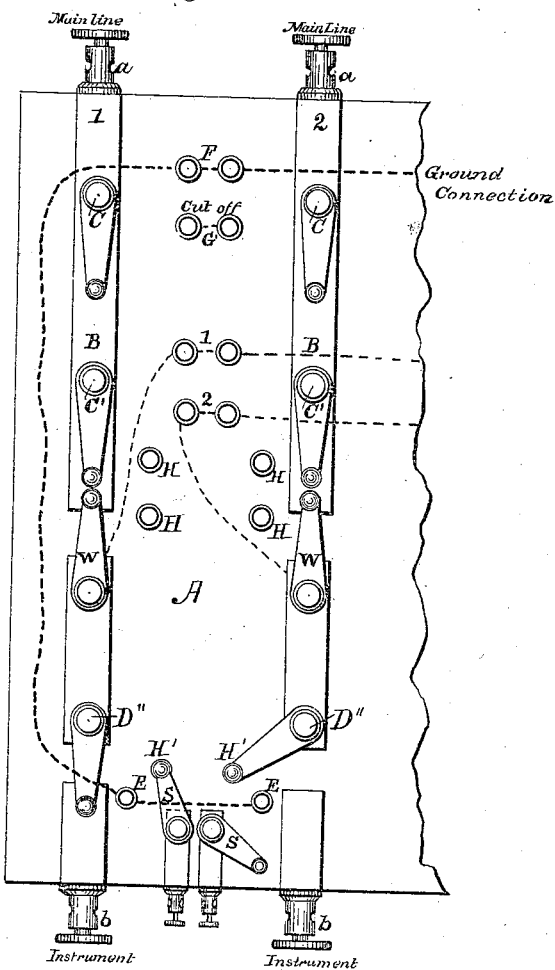

Figure 4, a similar detached sectional view in line $z\ z$ of fig. 1, illustrating the combination of switch-button with line plate, retained by simple spring, without base-cup or collar; and Figure 5, a plan view of a section of my switch-board, as arranged for end lines.

Similar letters indicate like parts in all of the figures.

The nature of my invention consists of a new, simple, and effective arrangement and combination of "switch-buttons" with connecting-plates or points and wires for controlling and changing at pleasure the direction of the electric currents in a telegraph system. Also in the combination of suitable springs with the operating buttons of a telegraph switch to retain them automatically upon the proper points and plates, and yet permit a free movement thereof upon their pivots without contact with other plates; the combination of an engaging recess or catch with a spring-actuated button on a telegraphic switch-board; the combination of a collar and base-cup with the shank or pivot of such spring-actuated button to facilitate the connection of the wire to said button, and the substitution of a spiral spring, in combination with a revolving swivel-head and a post, for the ordinary button in making ground connections. In its general arrangement, my switch-board consists of parallel rows of switch-buttons, equal in number to the lines entering or leaving the office, each row forming a connection of the line either to or from its proper instrument, the continuity of the line and the connection between all the buttons in a row being broken at one or two points only, to be restored at the operator's pleasure by means of a switch-button there placed for the purpose. That end of the board to which the outer lines are attached is considered the top, the instrument connections being from the opposite or bottom end. In a through-line switch (fig. 1) the line passes down one row and up the next to and from the instrument, so that two rows are embraced in each through line on the board. In an end-line board (fig. 5) one row suffices for each line. The cross-connections of any one line with other lines or instruments are obtained by series of points or plates, placed within reach of the buttons on said line, each point or plate being connected by wires with corresponding plates within reach of buttons on each of the other lines, each cross-wire having unbroken connection with some one line or instrument, as well as with detached plates or points near all. Ground connections are obtained at the upper and lower end of each row by means of a button, connected with a ground wire and placed so as to reach the lines, or by means of extra points having ground connection placed within reach of the lower or upper button in each row.

Fig. 1 of the accompanying drawings represents my improved switch-board, as constructed for two through lines (numbered 1 and 2.)

The board itself, A, may be made of walnut or other fine wood, or of gutta percha, marble, or other handsome non-conducting material. Upon its upper end are placed at equal intervals four thumb-screws, $a\ a$ $a^1\ a^1$, to receive the N. and S. (or E. and W.) wires of the respective lines. Below each of said thumb-screws, on a line therewith, and parallel to each other, strips or plates B B B' B', of brass or other good conducting metal are secured to the board A to receive the "switch-buttons" or levers C C' C C'. Each "switch-button" has a shank or pivot, $c$, (figs. 2 and 4,) extending through an aperture in the plate and board to the under side of the latter, and also an arm, $d$, to swing or rotate upon the face of the plate and board. The shank $c$ is sufficiently extended to receive an encircling spiral spring, P, (figs. 2 and 4,) which is confined against the board by means of a nut or other device at the end of the shank. This spring serves by its elastic tension to keep the arm $d$ firmly down upon the plate or board at any desired point, and yet allows its free movement as well as an elevation thereof at pleasure. At the lower end of each plate B B¹, and completing each row, I place the independent "instrument" switch-buttons D D' D D', each turning upon a suitable face-plate on the board, and having a pivot-shank, e, and suitable retaining-spring, P, as have the buttons above described. Between the switch-buttons C C C' C' on each through line, No. 1 and No. 2, I place first, and within reach of the two upper buttons C C, a plate, F, fig. 1, or connected pins or points, F', fig. 5, which may be connected with a main battery, where such is required, or otherwise with a ground wire. Next thereto, and also within reach of said upper buttons, I place a blank plate, G, fig. 1, or blank points G¹, fig. 5, to serve as a cut-off. Next, and within reach of the two following buttons, C' C', I place plates (fig. 1) or connected points, (fig. 2,) numbered 1 and 2, which are respectively connected across to the other lines, as hereafter indicated. Where there are more than two lines the number of these line plates is increased to correspond with the number of lines in use, and additional switch-buttons are used as may be necessary to reach these extra points. Within reach of the lower switch-buttons C', in each row, I place extra plates or pins H H, to which may be connected the wires of extra batteries or of testing instruments. Below these extra pins or plates are placed similar extra plates or pins H' H', within reach of the instrument switch-buttons D D', (or of the uppermost instrument button where the number of wires requires more than one in a row,) for making extra connections through the instruments. I also place ground-connection pins or plates E within reach of these instrument buttons, (where more than one on a line is used, then within reach of the lowermost one in the row,) either outside of the rows, as indicated in the drawings, or at such other point as may be found more convenient on any particular board. The instrument switch-buttons D D' are each placed so that the extremities of their arms, d, may reach the lower end of the brass plates in the main line above, so as to complete the connection thereby through to the instrument when desired. Within reach of these instrument buttons D D' (fig. 1) on each circuit, and between them on each through line, are also placed two pins, points, or plates, numbered 1' and 2', each having connections, as hereinafter indicated, with the other main lines in the office. When found desirable a ground connection may be obtained at the upper end of the switch-board for each line entering or leaving the office, by means of an extra button, K, placed between the two wires of a through-line circuit at the top of the board, so that its arms may reach pins or plates g g g g, touching upon said wires on either side thereof, as illustrated in fig. 1, the button K being connected immediately to a suitable ground wire. A blank plate, k, is placed midway between the connecting-plates g g, to serve as a rest and catch for the switch-button K when it is not in use. It is provided with a recess, i, (figs. 1 and 2,) which engages the end of the button-arm d and secures it from accidental displacement. Any form of catch may be substituted for that indicated, and the device may be employed for any and all the switch-buttons. As a substitute for a switch-button in making a ground connection I provide a post, L, figs. 1 and 3, connected with the ground wire, and having upon its upper end a revolving swivel-plate, m, to which is attached a metallic spiral spring, n, terminating in a loop to catch over a hook upon the connecting-plates g g on either side. The connection is made by simply hooking or unhooking the spiral wire n. To avoid the objection of connecting the wires directly to the rotating shanks c c of such buttons as are independent of the plates, (as are those marked D D and K,) I provide these switch-buttons with a collar, N, fig. 2, through which the shank c passes, and screw upon this collar a cup, O, to receive the base-spring P, and to which the wire may be permanently secured, the collar and cup being stationary. In extending the switch-board for a larger number of lines it is only necessary to extend the main-line plates B, and to add within reach of the buttons thereon so many additional line-connecting plates or pins (1 2 3 4, &c.,) as there are additional lines, and also a similar number of additional instrument plates or pins; 1' 2' 3', &c. Where more instrument buttons are required on each line or row they may be connected, as are the switch-buttons, by brass plates. Although this mode of connecting the buttons to the lines by interposing brass plates B is preferable, I contemplate securing each button to the board independently, and connecting them with each other and the main line by connecting-wires instead of a plate B, as illustrated. The apparatus being constructed for through lines, as described, (and illustrated in fig. 1,) the ends of the main-line wires N. and S., of 1 and 2, are secured to the thumb-screws on top end of board; from thence wires, indicated by blue dotted lines, extend beneath the board to pins projecting from the upper ends of the brass plates B B', touching on their way the plates g g. [Note: The plate B may, if preferred, be extended within reach of the upper buttons K, (or post L,) or even to contact with the thumb-screws a a, as shown in fig. 5, thereby dispensing with the plates g.] From the instrument buttons D D' wires, indicated by dotted green lines, extend to the instrument thumb-screws b b, which hold the wires from the instrument. The upper switch-plate 1, on No. 1 line, is connected directly with instrument of No. 1 line by wire extending therefrom to instrument button D'. From this same plate or switch-button 1 a wire also extends across to corresponding switch-plate 1 on No. 2 line, and if there were more lines it would be continued across to the corresponding switch-plates on each. In the same manner switch-plate 2, on No. 2 line, is connected by a cross-wire to corresponding switch, plate 2, on No. 1 line, (and on all other lines if there be more on the board,) and through a connection with the instrument switch-button D with the instrument on its line, No. 2, my design being to connect each plate in the rows or series in connection with one line with the instrument in said line, and with corresponding line, switch-plates, pins, or points on every other line on the board. Following this same system, each instrument switch-plate, as 1' and 2' on No. 1 line, is connected to its own main line by a wire therefrom to the main-line plate B, (as indicated in blue dotted lines,) and also to each corresponding instrument switch-plate on every other line on the board; 1' on line 1' to 1' on line 2; 2' on line 1 to 2' on line 2, &c. A thumb-screw, t, on one side of the board, holds the ground wire of the apparatus, which is connected by wires on back of the board to the post L, button K, and extra instrument, ground-connecting points or plates E E, as indicated by yellow lines in fig. 1. Although I have described spiral metallic springs as best adapted to secure the switch-buttons of the apparatus, I contemplate springs of India rubber or of metal in other forms than that of a spiral or volute coil, my invention being the combination of any form of spring the equivalent thereof, with the revolving switch or operating buttons of a telegraphic switch-board, in such manner as to allow the free revolution of said buttons. I do not deem it necessary to describe in this connection the various connections and combinations which may be made with my improved board. In fig. 1 of the accompanying drawings, however, the switch-buttons on the No. 1 line are illustrated as arranged in proper positions to secure the working of the line through its instrument direct. On No. 2 line the N wire entering is working through the instrument and thence through instrument switch-button D' to the ground by pin E and its ground connection. The wire leading south on same line is connected with the ground through the post L by means of its connecting spring $n$ and the plate $g'$ on the line. The red lines indicate a change in the connections, No. 1, N., being connected through its instrument with No. 2, S.; No. 1 south being at same time connected directly with the instrument of No. 2, and with north wire of No. 2. Where the switch-board is to be used only for lines terminating in the office I prefer to arrange it as illustrated in fig. 5 of the drawings. On this board, as the lines on each row 1 2, &c., terminate at the instrument, the points $1^1$ $2^1$ on the through board, fig. 1, for connecting the wires out, are not needed; but I place a button, S, fig. 5, at the lower end of the board near each line, said button having connection with the instrument, and being within reach of the ground-connecting point E', and extra end battery connecting point H', which points are also within reach of the lower instrument buttons D'' D''' of the lines. By this arrangement, the current passing through the instrument direct may be returned to the end battery by means of the button S upon H, (see line 1 fig. 5,) or to a ground connection upon E, or the line may be cut off from the instrument and connected immediately with the end battery by the button D''', as illustrated in line 2, fig. 5. In order to obtain through battery connection on the end line I make a second break in the rows, as shown in fig. 2, to be closed at pleasure by buttons W, which reach battery points H. By turning said button upon one battery point, and the switch-button above the same upon the other, the line will pass through the connected battery before reaching the instrument. By connecting posts and buttons directly through wholly by means of plates B upon the face of the board, as illustrated in fig. 5, the use of wires on the main line upon the under side of the board, and the difficulty of inspecting and repairing, are obviated.

Having thus fully described my invention, what I claim as new, and desire to secure by Letters Patent, is—

1. My improved telegraphic switch-board, having the within-described system of switch-buttons C C, arranged upon parallel main lines, in combination with transverse series 1 1, 2 2, 1' 1', 2' 2', &c, of switch-plates, pins, or points, and with suitable ground and extra connection plates or points, the points, plates, or pins 1 1, &c., in each particular series being connected together by wires, rods, or plates transversely to said main lines, and each of said lines and each of their instruments having direct connection with one, and one only, of said series in regular order, all substantially in the manner and for the purpose herein set forth.

2. I claim also the combination of a metallic, spiral, India-rubber or other equivalent spring, with the operating "buttons" G C of a telegraphic switch-board, substantially as and for the purpose herein set forth.

3. The combination of a base cap or cup, O, with a collar, N, and the shank $c$ of a spring-actuated switch-button, substantially in the manner and for the purpose herein set forth.

4. The combination of a revolving swivel-head, $m$, (fig. 1,) and attached metallic spring $n$, with a metallic post or other support, L, for the purpose of making ground and other connections for telegraph lines and instruments, substantially in the manner and for the purpose herein set forth.

5. The combination of a recess or catch $i$ with the rest-plate $k$ of a telegraphic switch-board, substantially in the manner and for the purpose herein specified.

The foregoing specification of my improved telegraphic switch-board signed by me this 9th day of January, 1867.

W. G. BROWNSON.

Witnesses:
DAVID A. BURR;
H. H. YOUNG.